United States Patent [19]

Byrne

[11] Patent Number: 4,710,548

[45] Date of Patent: Dec. 1, 1987

[54] BLENDS OF A POLYCARBONATE WITH A POLYESTER-POLYCARBONATE COPOLYMER

[75] Inventor: Joseph B. Byrne, Antioch, Calif.

[73] Assignee: The Dow Chemical Company, Midland, Mich.

[21] Appl. No.: 866,991

[22] Filed: May 19, 1986

Related U.S. Application Data

[63] Continuation of Ser. No. 307,135, Sep. 30, 1981, abandoned.

[51] Int. Cl.$^4$ .................... C08L 67/00; C08L 69/00; C08L 67/02
[52] U.S. Cl. .................................. 525/439; 524/537; 525/466
[58] Field of Search .................... 525/439; 524/537

[56] References Cited

U.S. PATENT DOCUMENTS

| | | | |
|---|---|---|---|
| 3,169,121 | 2/1965 | Goldberg | 528/173 |
| 3,792,115 | 2/1974 | Kishikawa et al. | 260/860 |
| 4,156,069 | 5/1979 | Prevorsek et al. | 528/182 |
| 4,189,549 | 2/1980 | Matsunaga et al. | 525/439 |
| 4,226,961 | 10/1980 | Motz | 525/439 |
| 4,252,922 | 2/1981 | Adelmann et al. | 525/439 |
| 4,260,731 | 4/1981 | Mori et al. | 528/173 |
| 4,278,787 | 7/1981 | Swart | 528/191 |
| 4,330,662 | 5/1982 | Bales | 528/176 |
| 4,360,656 | 11/1982 | Swart et al. | 528/176 |
| 4,469,850 | 9/1984 | Belfoure et al. | 525/439 |

FOREIGN PATENT DOCUMENTS

| | | | |
|---|---|---|---|
| 0131048 | 10/1980 | Japan | 525/439 |
| 0133445 | 10/1980 | Japan | 525/439 |

OTHER PUBLICATIONS

Matsuura, T. et al., Jour. of App. Poly. Sci., vol. 20 (1976), pp. 1515 & 1516.

Primary Examiner—Wilbert J. Briggs, Sr.

[57] ABSTRACT

Blends of aromatic polyestercarbonate copolymers with aromatic polycarbonate resins provide improved low temperature toughness while maintaining tensile strength essentially equivalent to the polycarbonate component. Particularly preferred components are polycarbonates of bisphenol A and a polyestercarbonate derived from bisphenol A, phosgene and terephthaloyl and isophthaloyl chlorides.

13 Claims, No Drawings

BLENDS OF A POLYCARBONATE WITH A POLYESTER-POLYCARBONATE COPOLYMER

CROSS REFERENCE TO RELATED APPLICATION

This is a continuation of application Ser. No. 307,135, filed Sept. 30, 1981, now abandoned.

BACKGROUND OF THE INVENTION

This invention relates to a blend of (1) a linear copolymer that contains both carbonate and carboxylate moieties and (2) an aromatic polycarbonate resin.

Polycarbonate resins are widely employed in applications where a tough, rigid thermoplastic is required. Of particular importance are polycarbonates derived from bisphenol-A diols as are described in U.S. Pat. No. 3,028,365. However, the usefulness of polycarbonates is limited by the precipitous decline in impact strength where the resin is present in greater than a certain thickness (so-called "thickness sensitivity") as well as the relatively poor low-temperature toughness and the moderate heat distortion temperature of the resin.

U.S. Pat. No. 3,792,115 describes blends of a polycarbonate with a polyarylene ester. These blends are reported to possess improved impact strength and heat deformation resistance.

Linear copolymers containing ester and carbonate groups having improved thermal properties relative to polycarbonates have recently been introduced. U.S. Pat. Nos. 4,156,069 and 4,105,633 describe polyestercarbonate copolymers containing alternating ester and carbonate groups. These alternating copolymers are disclosed to possess improved impact and thermal properties compared with a typical polycarbonate resin. U.S. patent application Ser. No. 200,759, filed Oct. 27, 1980, now U.S. Pat. No. 4,330,662, describes polyestercarbonates consisting of repeating units corresponding to the formula

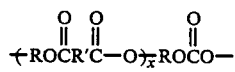

wherein R is an aromatic hydrocarbylene moiety, R' is a meta or para phenylene group and x is a number from 0.05 to 10. This copolymer possesses good processability and low temperature toughness.

The mechanical and thermal properties of all of the aforementioned polyestercarbonate copolymers exhibit considerable variance dependent on the ratio of ester to carbonate moieties present. Heretofore, it has been necessary to tailor the copolymer composition to provide the desired balance of properties. The manufacture of the copolymers in the relatively small quantities for specific applications has significantly increased the cost of the resin relative to the projected cost of larger scale operations. It would therefore be desirable to produce an engineering plastic the properties of which can be more economically varied to meet the requirements of a variety of end uses.

SUMMARY OF THE INVENTION

In accordance with the present invention, it has been found that a blend of a polycarbonate with a polyestercarbonate copolymer or terpolymer will exhibit mechanical and thermal properties very similar to a synthesized polyestercarbonate copolymer having the same overall ratio of ester to carbonate groups. This polyestercarbonate copolymer blend comprises: (a) from about 1 to about 99 weight percent of a normally-solid polyestercarbonate containing a plurality of repeating units corresponding to the formula I:

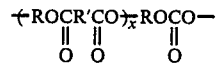

wherein each R is independently aromatic hydrocarbylene or inertly-substituted aromatic hydrocarbylene; each R' is independently meta- or para-phenylene and x is a number from 0.05 to 10; and (b) from about 99 to about 1 weight percent of a normally-solid aromatic hydrocarbylene or inertly-substituted aromatic hydrocarbylene polycarbonate resin, with the proviso that the overall ratio of ester to carbonate groups in the blend is in the range from about 1:19 to about 7:1.

For the purposes of this invention, an "aromatic hydrocarbylene" is a divalent radical containing at least one aromatic moiety. Preferably, two aromatic moieties are present and each aromatic moiety bears one of the valences. The two aromatic moieties can be linked by

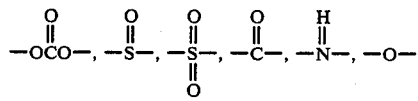

or a chemical bond. Preferably, the aromatic moieties are joined by an alkylene or alkylidene group optionally bearing a phenyl substituent. An "inertly substituted" group is one having one or more substituents other than hydrogen, said substituents being inert in the blended composition and during the preparation of the composition.

DETAILED DESCRIPTION OF THE INVENTION

Polyestercarbonate Copolymer Component

Polyestercarbonate copolymers as described hereinbefore are in general compositions known in the prior art. U.S. Pat. Nos. 4,260,731, 4,255,556, 4,156,069 and 4,105,633 describe a variety of polyestercarbonate copolymers and methods for preparing them. The relevant portions of these patents are incorporated by reference herein.

The group represented by "—O—R—O—" in Formula I is preferably derived from a dihydric phenol, such as, for example, 2,2-bis-(4-hydroxyphenyl)propane (i.e., bisphenol-A), bis-(4-hydroxyphenyl)methane, 1,1-bis-(4-hydroxyphenyl)ethane and phenolphthalein. Most preferably, "—O—R—O—" is derived from bisphenol A. The preferred ratio of ester to carbonate groups in the polyestercarbonate is from about 1:1 to about 4:1.

The polyestercarbonate component should have a molecular weight sufficiently high so that it is a solid at ambient conditions, i.e., normally solid. Generally, a weight average molecular weight (as determined by gel permeation chromatography using a bisphenol-A polycarbonate for calibration) of at least 20,000 is preferred. A copolymer having a weight average molecular weight in the range from about 25,000 up to about 40,000 and a polydispersity (i.e., the ratio of weight average molecular weight to number average molecular weight) of from about 1.5 to about 5, is especially preferred. Where a copolymer having a molecular weight less than about 25,000 is employed, the physical properties of the blend may be deleteriously affected.

Particularly preferred as a component of the blend are ordered copolymers made up of repeating units corresponding to formula I wherein the molar ratio of para-phenylene to meta-phenylene in the groups represented by R' is in the range from 0.95:0.05 to 0.05:0.95. More preferably the molar ratio of para- to meta-phenylene is in the range from 0.9:0.1 to 0.5:0.5, most preferably about 0.8:0.2. The Izod impact resistance at ambient temperatures (determined in accordance with ASTM D-256) and the processability of the blend generally increases with increasing amounts of meta-phenylene in the copolymer. The heat distortion, low temperature impact resistance and fatigue resistance generally increase as the para-phenylene present in the copolymer increases, while notch sensitivity and thickness sensitivity generally decreases.

The aforementioned preferred polyestercarbonate resins are conveniently prepared by a two-step process wherein an excess of a dihydric phenol is first reacted with a mixture of isophthaloyl halide and terephthaloyl halide in the presence of a hydrogen chloride acceptor such as pyridine. The dihydroxyester intermediate produced by this reaction is then reacted with phosgene or some other agent which will form the desired carbonate linkages. The phosgene should initially be introduced rapidly to prevent formation of polyester oligomers, especially where terephthaloyl halide is the major acid chloride reactant. Both steps of the process are normally carried out under an inert atmosphere such as nitrogen at a temperature from about 10° to about 35° C. with the reactants dissolved in one or more solvents, e.g., methylene chloride, such that the reactants are totally miscible. While the concentrations of the reactants in the solvents are not particularly critical, the concentration of dihydric hydrocarbylene is preferably from about 2 to about 10 weight percent and the concentration of the mixture of isophthaloyl halide and terephthaloyl halide is preferably from about 1 to about 5 weight percent based on the total weight of monomers and solvents. In the second step of the reaction, the concentration of ester intermediate is preferably from about 3 to about 15 weight percent based on total weight of ester intermediate and solvents.

Aromatic Polycarbonate Component

The aromatic polycarbonates used in the subject blends are well-known compounds. Generally, these polycarbonates contain a plurality of structural units corresponding to the formula II

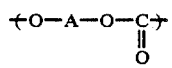

$$\left( O-A-O-\underset{\underset{O}{\|}}{C} \right) \quad \text{II}$$

wherein A is a divalent aromatic hydrocarbylene radical. The aromatic polycarbonate is conveniently prepared by reacting a dihydric phenol with phosgene or some other carbonate precursor in a manner known in the art. Preferably, the group "—O—A—O—" is derived from a dihydric phenol, such as, for example, bisphenol A, bis-(4-hydroxyphenyl)methane, 1,1-bis-(4-hydroxyphenyl)ethane and phenolphthalein. Most preferably, "—O—A—O—" is derived from bisphenol A.

The molecular weight of the polycarbonate should be such that the polymer is a solid at ambient conditions, but readily processable at molding temperatures. Generally, a weight average molecular weight of from about 25,000 to about 40,000 is preferred. At lower molecular weights the physical properties of the blend are less advantageous. The molecular weight is determined by means of gel permeation chromatography.

Other Components

Other components can be incorporated into the polymer blend to improve specific properties of the blend. For example, fire retardants, plasticizers, mold release agents, thermal stabilizers and U.V. light stabilizers can all be used to advantage. Generally, these other components are used in small, but effective amounts so as to minimize deleterious effects on the properties of the blend.

Blending

The polycarbonate and polyestercarbonate can be blended by any technique which affects intimate mixing of the components without significant mechanical or thermal degradation of the polymer components. For example, the components can be dissolved or dispersed in a compatible diluent, blended together to produce a homogeneous dispersion or solution and the diluent removed.

The preferred method for blending the polymer components is in an extruder at a temperature and shear rate which will effect intimate mixing without significant polymer degradation. Generally, temperatures in the range from about 250° to about 370° C. are suitable. An extruder temperature of at least 285° C. is preferred when component polymers having high softening temperatures are employed.

Preferably the blend comprises from about 10 to about 90 weight percent polycarbonate and about 90 to about 10 weight percent of the polyestercarbonate. Most preferably the blend comprises from about 90 to about 50 percent polycarbonate and from about 10 to about 50 polyestercarbonate.

Properties

Surprisingly, the subject polyestercarbonate/polycarbonate blends exhibit toughness superior to that of any of the component polymers at temperatures below about −25° C. The improved low temperature toughness is apparent in an Izod impact test performed in conformance with the method set out in ASTM D-256. The impact strength at low temperatures is generally greatest where R' in formula I represents predominantly paraphenylene groups.

These blends also exhibit improved Izod impact strength over a wide range of temperatures where the notch has a 5 mil radius. In certain preferred embodiments, the subject blends will exhibit Izod impact strengths greater than 3, more preferably greater than 4 foot-pounds per inch notch, when specimens are tested in accordance with ASTM D-256 except that 5 mil notch radii are employed.

Generally, the greatest impact resistance at ambient temperatures is attained with a blend having an ester-to-carbonate ratio from about 1:9 to about 1:3. The impact resistance of the blend typically reaches a maximum at an ester-to-carbonate ratio of about 1:4.

These blends also exhibit increased fatigue resistance, increased environmental stress crack resistance, higher softening temperatures, better resistance to heat aging and improved hydrolytic stability relative to the polycarbonate resin present in the blend. The greatest improvement in these properties is observed where the groups represented by R' are predominantly para-phenylene. The greatest fatigue resistance is attained with a blend having an overall ester to carbonate ratio in the range from about 2:1 to about 4:1. The environmental stress crack resistance is also typically greatest with a blend having an overall ester to carbonate ratio of about 1:4. The subject polymer blends are least susceptible to a deterioration of physical properties at elevated temperatures (between about 125° and about 150° C.) where the overall ratio of ester to carbonate groups present is in the range from about 1:10 to about 3:1.

In some preferred embodiments of the subject blends the Vicat softening temperature as determined in accordance with ASTM D-1525 is at least 152° C. More preferably, the Vicat heat distortion temperature of these blends is at least 155° C., most preferably at least 160° C. Generally, the heat distortion temperature rises as the ester content in the blend is increased.

It has been observed that the polyestercarbonate/polycarbonate blends exhibit a striking similarity in properties to polyestercarbonate copolymers having the same ester-to-carbonate group ratio. The blended resin does exhibit a slightly lower heat distortion temperature than does the comparable copolymer. This observation suggests an unexpected compatability in the two components in the subject blends. The blend surprisingly evidences little if any biphasic character.

In one embodiment, more than one polyestercarbonate or polycarbonate component can be included in the blend. Surprisingly, it has been found that this blend will possess physical properties very similar to a polyestercarbonate copolymer having the same overall ratio of ester to carbonate moieties and the same overall ratio of meta- to para-phenylene groups.

The following examples are presented to illustrate the invention. Unless otherwise indicated, all parts and percentages are by weight.

Preparation of Polyestercarbonate—Experiment A

To a 12-liter flask is charged 751.0 grams of bisphenol A, 7.938 liters of methylene chloride and 676.6 grams of pyridine. Stirring is initiated when the solution clears and 333.93 grams of isophthaloyl chloride is added continuously to the flask at a temperature from 19° to 25° C.

The solution is stirred an additional 10 minutes and then 12.35 grams of p-tert-butylphenol is introduced. Through this stirred solution is sparged 175.7 grams of phosgene over a period of 56 minutes at a temperature of 22° to 25° C.

To the resulting solution is added 1.5 liters of 3.0 N HCl to neutralize excess pyridine. The methylene chloride solution is extracted sequentially with 1 liter of 0.5 N HCl and 1 liter of water. The methylene chloride solution is passed through a column packed with about 550 milliliters of a strong acid cation exchange resin. To isolate the polymer 1 volume of the methylene chloride solution is added with rapid stirring to 5 volumes of hexane. The resulting white fibers are isolated by filtration dried in air for 24 hours and then dried under reduced pressure for 48 hours at 120° C. to yield 900.1 grams of product.

Analysis of the polymer by infrared, proton magnetic resonance and elemental analysis confirmed that it is an alternating copolymer represented by the structural formula:

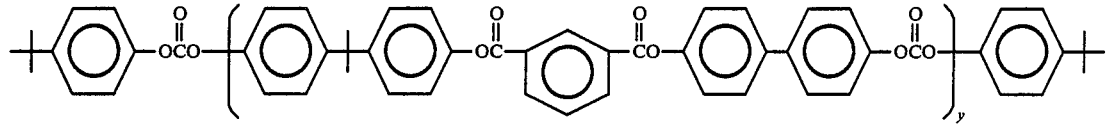

wherein $y+1$ is the number of carbonate groups per molecule.

Polyestercarbonate copolymers can be made in accordance with the foregoing method using terephthaloyl chloride or a mixture of isophthaloyl and terephthaloyl chlorides.

EXAMPLES 1-8

A polyestercarbonate and a polycarbonate were blended in a variety of ratios. The polyestercarbonate copolymer ("PEC") was prepared in a manner similar to Experiment A except that terephthaloyl chloride was employed as a reactant in place of isophthaloyl chloride. This PEC had an ester-to-carbonate ratio of 2:1. The polycarbonate ("PC") was a bisphenol A polycarbonate sold by Mobay Chemical Company under the designation MERLON M50F.

The PEC and PC were dry-blended at 20° C. to attain the ratio of ester-to-carbonate groups tabulated in Table 1. The crude mixture was then dried at 125° C. to remove water, which can deleteriously affect the physical properties of the final blend. The dried mixture was then extruded at a temperature of from 230° to 280° C. in a three-fourth inch, two-stage, single-screw Killion extruder. The resulting strand was pelletized, dried and injection-molded at a temperature in the range from 260° to 300° C. Extrusion and molding temperatures in the higher end of the ranges specified were employed with blends containing a relatively large percentage of ester moieties.

The physical properties of the 0.32 centimeter thick injection-molded specimens were determined in accordance with standard methods. The tensile strength data is collected in Table I. The notched Izod impact data collected for 5 mil and 10 mil notch radii is presented in Table II.

TABLE I

| Example No. | Ester:Carbonate | Tensile at Yield | | |
|---|---|---|---|---|
| | | Stress (psi)** | Strain (%)** | Modulus (psi)** |
| 1* | No ester | 8300 | 6.5 | 293,000 |
| 2* | 1:29 | 8450 | 6.4 | 283,000 |
| 3 | 1:14 | 8430 | 6.8 | 277,000 |
| 4 | 1:9 | 8710 | 6.7 | 287,000 |
| 5 | 2:13 | 8720 | 6.6 | 271,000 |
| 6 | 1:5 | 8650 | 7.0 | 282,000 |
| 7 | 1:4 | 9780 | 6.9 | 275,000 |
| 8 | 4:11 | 8613 | 6.9 | 286,000 |

*Not an embodiment of this invention.
**In accordance with ASTM D-638.

TABLE II

| Example No. | Ester: Carbonate | Notched Izod Impact[2] (Ft. Lbs./In. Notch) | | | | | |
|---|---|---|---|---|---|---|---|
| | | 5 mil at 23° C. | 10 mil at °C. | | | | |
| | | | 23 | 0 | −18 | −30 | −40 |
| 1* | No ester | 2.9 | 18.9 | 17.8 | 10.2 | 3.2 | 2.8 |
| 2* | 1:29 | 2.1 | 18.4 | 17.0 | 13.9 | 5.1 | 2.5 |
| 3 | 1:14 | 7.3 | 17.5 | 16.6 | 13.9 | 3.4 | 2.8 |
| 4 | 1:9 | 13.7 | 14.9 | 13.7 | 13.0 | 8.1 | 8.8 |
| 5 | 2:13 | 12.0 | 15.0 | 14.2 | 12.7 | 10.2 | 4.2 |
| 6 | 1:5 | 12.5 | 13.4 | 12.8 | 12.4 | 11.6 | 10.3 |
| 7 | 1:4 | 11.2 | 12.6 | 11.6 | 11.3 | 10.6 | 4.6 |
| 8 | 4:11 | 8.5 | 10.5 | 9.4 | 6.8 | 5.1 | 5.5 |

*Not an embodiment of this invention.
[2]In accordance with ASTM D-256, except notch radii was 5 mil where noted.

The data tabulated in Tables I and II demonstrate that the PEC blends exhibit superior impact strength at low temperatures and reduced notch sensitivity at ambient temperatures relative to polycarbonate itself without sacrificing tensile strength. The improvement is particularly clear with those blends having ratios of ester-to-carbonate groups in the range from 1:9 to 1:4.

EXAMPLES 9–13

Two polyestercarbonates were prepared in the manner of Experiment A. One of these polyestercarbonates was prepared from isophthaloyl chloride (I) and the other from terephthaloyl chloride (T). A mixture of a total of 4 parts of the two polyestercarbonates are blended with 16 parts of a polycarbonate of bisphenol A in an extruder at 250° C. in a manner similar to Example 2. The ratio of the two polyestercarbonates in the blend (T:I) is tabulated in Table III. In each instance the PEC contains ester and carbonate groups in a ratio of 2:1. Various properties of these blends are reported in Table III.

TABLE III

| Example No. | T:I | Tensile[3] | | | Vicat[4] SP (°C.) | Notched Izod Impact[5] (Ft. Lbs./In.) | | | | | |
|---|---|---|---|---|---|---|---|---|---|---|---|
| | | Stress (psi) | Strain (%) | Mod (psi) | | 5 mil 23° C. | 10 mil at °C. | | | | |
| | | | | | | | 23 | 0 | −18 | −30 | −40 |
| 9 | 0:4 | 8722 | 6.4 | 292,000 | 160 | 2.4 | 15.8 | 15.2 | 8.9 | 3.4 | 5.5 |
| 10 | 1:3 | 8581 | 6.6 | 284,000 | 162 | 2.2 | 16.1 | 14.9 | 13.9 | 3.7 | 6.0 |
| 11 | 2:2 | 8489 | 6.9 | 274,000 | 162 | 4.9 | 17.4 | 15.2 | 13.1 | 10.1 | 11.1 |
| 12 | 3:1 | 8529 | 6.8 | 279,000 | 162 | 13.7 | 17.1 | 14.6 | 13.1 | 12.9 | 12.0 |
| 13 | 4:0 | 8652 | 6.5 | 304,000 | 162 | 8.9 | 14.9 | 13.9 | 11.9 | 11.7 | 11.3 |

[3]In accordance with ASTM D-638.
[4]In accordance with ASTM D-1525, temperature raised at rate of 120° C. per hour.
[5]In accordance with ASTM D-256, except notch radii was 5 mil where noted.

EXAMPLES 14–17

Specimens of the extruded blends tested in Examples 4, 5, 6 and 8 were immersed in water at 100° C. At regular intervals some of the specimens were removed for testing. The Izod impact strength of these specimens was tested at 23° C. in accordance with ASTM D-256 at a 10 mil radius. The impact strength of those samples which had lost integrity was not determined. The results of these tests are tabulated in Table IV.

TABLE IV

| Example No. | Ester: Carbonate | Izod Strength After Indicated Hours In H$_2$O (Ft. Lbs./In.) | | | | | | |
|---|---|---|---|---|---|---|---|---|
| | | 0 hrs. | 2 hrs. | 4 hrs. | 6 hrs. | 24 hrs. | 48 hrs. | 72 hrs. |
| 14* | No Ester | 19.0 | 18.0 | 17.0 | 18.6 | 2.6 | | |
| 15 | 1:9 | 14.9 | 16.6 | 17.0 | 17.0 | 17.1 | 13.2 | 2.2 |
| 16 | 2:13 | 15.0 | 11.9 | 14.5 | 14.4 | 8.8 | | |
| 17 | 1:5 | 13.4 | 14.4 | 13.5 | 13.8 | 12.7 | 11.1 | 7.0 |
| 18 | 4:11 | 10.5 | 9.2 | 9.3 | 8.7 | 3.8 | | |

*Not an embodiment of this invention.

It is noteworthy that after immersion in water for 24 hours all of the blends exhibit impact strength significantly greater than the polycarbonate.

What is claimed is:

1. A polyestercarbonate copolymer or terpolymer blend comprising:
   (a) from about 1 to about 99 weight percent of at least one normally-solid polyestercarbonate copolymer or terpolymer which contains a plurality of repeating units comprising ester moieties corresponding to the formula

and carbonate moieties corresponding to the formula

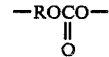

wherein each R is independently aromatic hydrocarbylene or inertly-substituted aromatic hydrocarbylene, each R' is independently meta- or para-phenylene and the number of ester and carbonate moieties are selected such that the ratio of ester to carbonate moieties is from 0.05 to 10; and
   (b) from about 99 to about 1 weight percent of at least one normally-solid aromatic hydrocarbylene or inertly-substituted aromatic hydrocarbylene polycarbonate resin, with the proviso that the overall ratio of ester to carbonate groups in the polyestercarbonate blend is in the range from about 1:19 to about 7:1 and the Izod impact strength of a blend consisting essentially of components (a) and (b) alone is at least about 4.0 foot-pounds per inch notch at 23° C. when a blend specimen having a 5 mil notch radius is tested otherwise in accordance with ASTM D-256.

2. The blend as defined in claim 1 wherein from about 10 to about 90 weight percent of an ordered polyestercarbonate copolymer and about 90 to about 10 weight percent of polycarbonate is present.

3. The blend as defined in claim 2 wherein the polyestercarbonate is derived from bisphenol A, bis-(4-hydroxyphenyl)methane, 1,1-bis-(4-hydroxyphenyl)ethane or phenolphthalein.

4. The blend as defined in claim 2 wherein the polyestercarbonate is derived from bisphenol A.

5. The blend as defined in claim 2 wherein the polyestercarbonate is a terpolymer and the molar ratio of para-phenylene to meta-phenylene moieties in the polyestercarbonate is from about 0.95:0.05 to about 0.05:0.95.

6. The blend as defined in claim 3 wherein the polycarbonate is derived from bisphenol A, bis-(4-hydroxyphenyl)methane, 1,1-bis-(4-hydroxyphenyl)ethane or phenolphthalein.

7. The blend as defined in claim 4 wherein the polycarbonate is derived from bisphenol A.

8. The blend as defined in claim 7 wherein the overall ratio of ester to carbonate moieties in the blend is from about 1:10 to about 3:1.

9. The blend as defined in claim 7 wherein two polyestercarbonates are blended with the polycarbonate, one of the polyestercarbonate components containing exclusively meta-phenylene moieties and the other polyestercarbonate component containing exclusively para-phenylene moieties.

10. The blend as defined in claim 6 wherein the Vicat heat distortion of the blend as determined in accordance with ASTM D-1525 is at least 152° C.

11. The blend as defined in claim 1 which consists essentially of the polycarbonate and polyestercarbonate, optionally with a small amount of fire retardant, plasticizer or other adjuvants.

12. The product produced by blending in an extruder
   (a) from about 1 to about 99 weight percent of at least one normally-solid ordered polyestercarbonate copolymer or terpolymer which contains a plurality of repeating units comprising ester moieties corresponding to the formula

and carbonate moieties corresponding to the formula

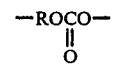

wherein each R is independently aromatic hydrocarbylene or inertly-substituted aromatic hydrocarbylene, each R' is independently meta- or para-phenylene and the number of ester and carbonate moieties are selected such that the ratio of ester to carbonate moieties is from 0.05 to 10; and
   (b) from about 99 to about 1 weight percent of at least one normally-solid aromatic hydrocarbylene or inertly-substituted aromatic hydrocarbylene polycarbonate resin, with the proviso that the overall ratio of ester to carbonate groups in the polyestercarbonate blend is in the range from about 1:19 to about 7:1 and the Izod impact strength of a blend consisting essentially of components (a) and (b) alone is at least about 4.0 foot-pounds per inch notch at 23° C. when a blend specimen having a 5 mil notch radius is tested otherwise in accordance with ASTM D-256.

13. The blend as defined in claim 11 wherein the Izod impact strength of a blend specimen having a 10 mil notch tested at −30° C. in accordance with ASTM D-256 is at least about 8.0 foot-pounds per inch.

* * * * *